US009222557B2

United States Patent
Wu

(10) Patent No.: US 9,222,557 B2
(45) Date of Patent: Dec. 29, 2015

(54) DUAL-SCREW LINEAR ACTUATOR

(71) Applicant: TIMOTION TECHNOLOGY CO., LTD., New Taipei (TW)

(72) Inventor: Chou-Hsin Wu, New Taipei (TW)

(73) Assignee: TIMOTION TECHNOLOGY CO., LTD., New Taipei (TW)

( * ) Notice: Subject to any disclaimer, the term of this patent is extended or adjusted under 35 U.S.C. 154(b) by 406 days.

(21) Appl. No.: 13/890,561

(22) Filed: May 9, 2013

(65) Prior Publication Data

US 2014/0290403 A1    Oct. 2, 2014

(30) Foreign Application Priority Data

Mar. 28, 2013   (TW) .............................. 102205766 U

(51) Int. Cl.
*F16H 27/02*  (2006.01)
*F16H 25/20*  (2006.01)

(52) U.S. Cl.
CPC ...... *F16H 25/2056* (2013.01); *F16H 2025/209* (2013.01); *F16H 2025/2081* (2013.01); *Y10T 74/18672* (2015.01)

(58) Field of Classification Search
CPC ..................... Y10T 74/18672; F16H 25/2056
USPC ............................................. 74/89.35, 89.28
See application file for complete search history.

(56) References Cited

U.S. PATENT DOCUMENTS

| 3,592,070 A | * | 7/1971 | Hammond | ................... 74/89.35 |
| 9,016,152 B2 | * | 4/2015 | Jones et al. | ................... 74/89.39 |
| 2007/0144279 A1 | * | 6/2007 | Wu et al. | ....................... 74/22 A |
| 2010/0018334 A1 | * | 1/2010 | Lessing | ......................... 74/89.35 |

* cited by examiner

*Primary Examiner* — William Kelleher
*Assistant Examiner* — Randell J Krug
(74) *Attorney, Agent, or Firm* — Chun-Ming Shih; HDLS IPR Services

(57) ABSTRACT

A dual-screw linear actuator includes an inner push tube, an outer push tube, a first nut part, and a second nut part. The outer push tube is sheathed on the inner push tube and axially movable on the inner push tube; the first nut part is coupled to the outer push tube and screwed to an inner screw which has a coupling disposed at a front end of the inner screw; the second nut part is coupled to the inner push tube and screwed to an outer screw, and the outer screw is hollow, and the coupling is sleeved into the outer screw for an axial movement. The inner screw drives the outer screw to rotate, such that the first and second nut parts can synchronously push the inner and outer push tubes to extend or contract, so as to improve the stroke of extension or contraction.

14 Claims, 6 Drawing Sheets

DUAL-SCREW LINEAR ACTUATOR

FIELD OF THE INVENTION

The present invention relates to a driving device, and more particularly to a dual-screw linear actuator.

BACKGROUND OF THE INVENTION

In general, a conventional linear actuator comprises a driver, a transmission rod and a worm shaft, and a worm gear of the transmission rod linked with the driver, wherein the transmission rod can be extended and contracted by a screw to push an inner tube to achieve the linear actuation effect.

However, most of the conventional linear actuators achieve an extension or a contraction by using a single screw, so that the stroke of extension or contraction is usually limited by the length of the single screw. Even though the stroke of extension or contraction can be increased, it is necessary to increase the length of the screw. As a result, the axial length or size for the installation must be increased when the linear actuator is in a contracted state, and the linear actuator is inapplicable in a space limiting occasion. In addition, a basic structure having dual screws arranged in parallel with each other is also adopted to increase the stroke of extension or contraction of the linear actuator, but the parallel arrangement of the dual screws causes an increase of the width and size for the installation and a decrease of supporting force and stability, and thus the conventional linear actuator requires improvements.

In view of the foregoing problems, the inventor of the present invention based on years of experience in the related industry to conduct extensive researches and experiments to develop a dual-screw linear actuator to overcome the problems of the prior art.

SUMMARY OF THE INVENTION

Therefore, it is a primary objective of the present invention to provide a dual-screw linear actuator having dual screws sleeved therein for a linkage to achieve the effect of extending or contracting two push tubes synchronously in order to increase or even double the stroke of extension or contraction without the need of increasing the contraction dimension.

Another objective of the present invention is to provide a dual-screw linear actuator to meet the strict requirement for a higher or longer adjusting interval or apply in the aforementioned occasion.

A further objective of the present invention is to provide a dual-screw linear actuator having push tubes sheathed with each other in a sequence from the push tube with a larger external diameter to the push tube with a smaller external diameter; in other words, the pushed-out push tube has the smallest external diameter, so that the load can be reduced when the linear actuator is extended and the stability of the extension or contraction can be improved.

To achieve the aforementioned objective, the present invention provides a dual-screw linear actuator comprising an inner push tube, an outer push tube, a first nut part, and a second nut part, wherein the outer push tube is sheathed on the inner push tube and axially movable on the inner push tube; the first nut part is coupled to the outer push tube and screwed to a coupling disposed at a front end of the inner screw; and the second nut part is coupled to the inner push tube and screwed to an outer screw, and the outer screw is hollow, and the coupling is sleeved into the outer screw and axially movable along the outer screw; thereby, when the inner screw rotates, the outer screw is driven to rotate, such that first and second nut parts on the inner and outer screws are capable of pushing the inner and outer push tubes synchronously for an extension or a contraction.

DESCRIPTION OF THE PREFERRED EMBODIMENTS

Figure 1:
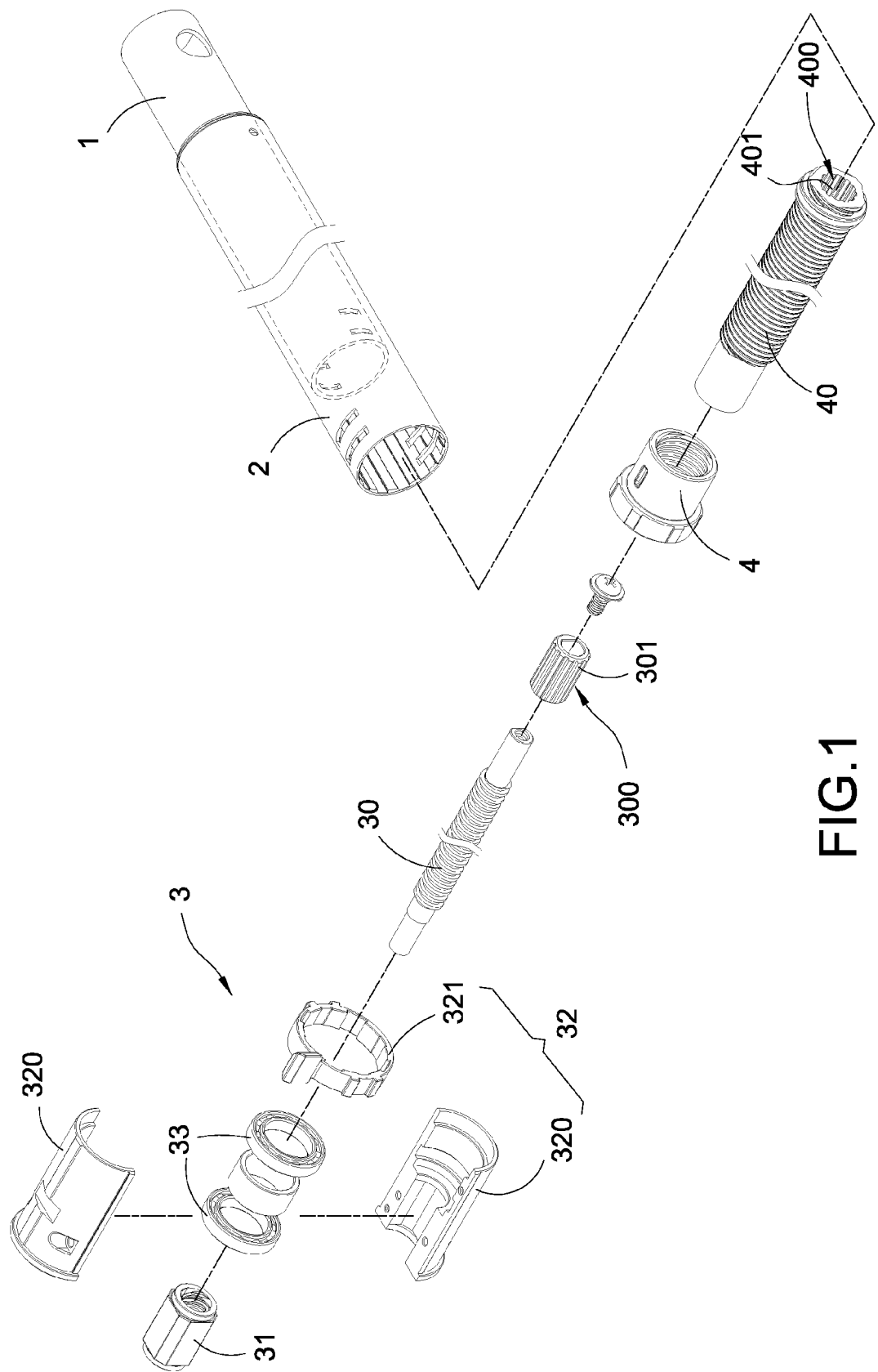
FIG. 1 is an exploded view of the present invention.

The technical contents of the present invention will become apparent with the detailed description of preferred embodiments accompanied with the illustration of related drawings as follows. It is noteworthy that same numerals are used for representing same respective elements in the drawings.

Figure 2:
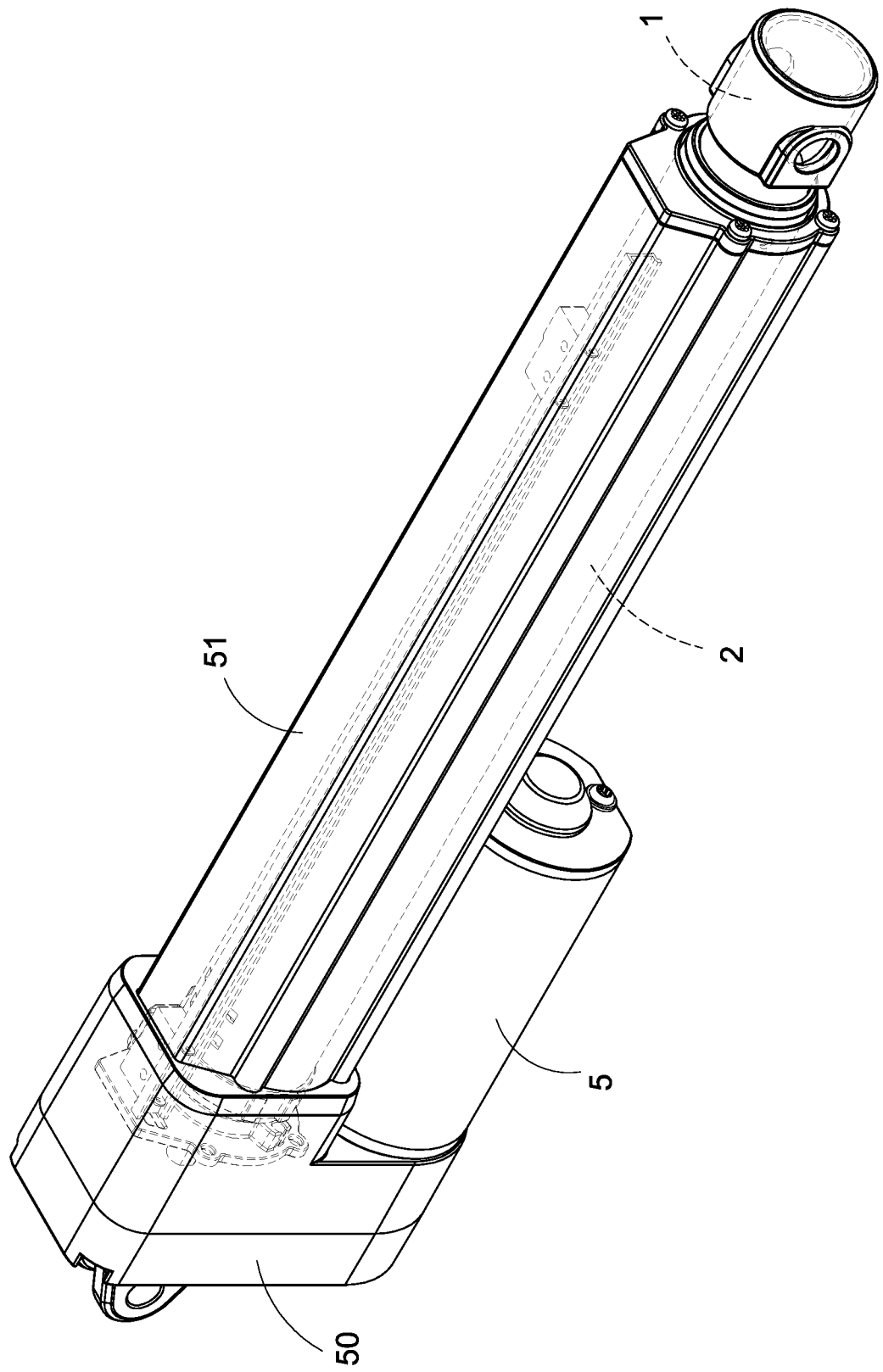
FIG. 2 is a perspective view of the present invention when contracted.
Figure 3:
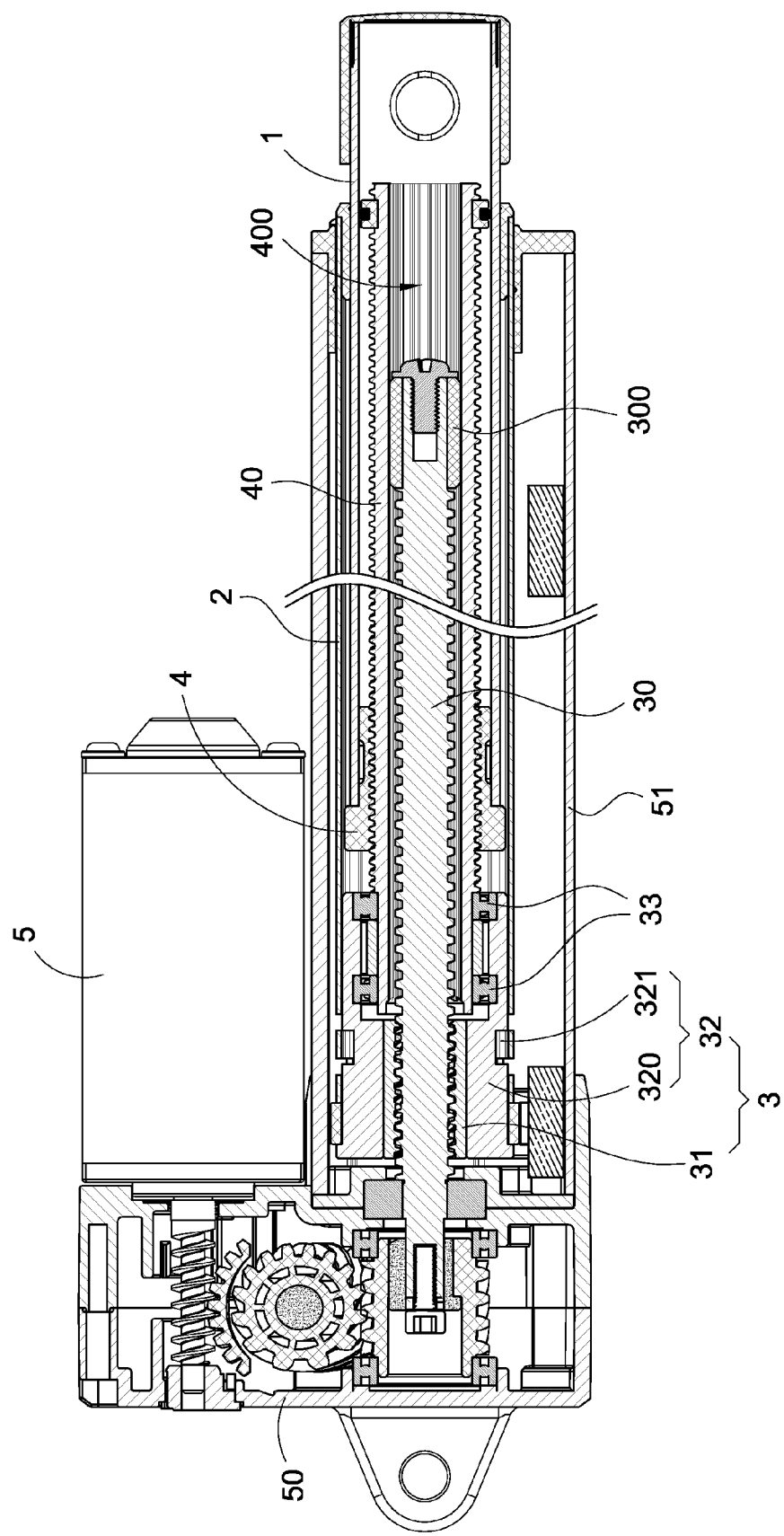
FIG. 3 is a cross-sectional view of the present invention when contracted.

With reference to FIGS. 1 to 3 for an exploded view of the present invention and a schematic view and a cross-sectional view of the present invention when contracted respectively, the present invention provides a dual-screw linear actuator comprising an inner push tube 1, an outer push tube 2, a first nut part 3, and a second nut part 4.

The inner and outer push tubes 1, 2 are hollow shafts, and the outer push tube 2 is sheathed on the inner push tube 1 and axially movable on the inner push tube 1 to define a telescopic slide.

The first nut part 3 is coupled to the aforementioned outer push tube 2, and the first nut part 3 is screwed to an inner screw 30, and a coupling 300 is disposed at a front end of the inner screw 30. In a preferred embodiment of the present invention, the first nut part 3 comprises a first screw cover 31, and a socket part 32 coupled between the first screw cover 31 and an end of the outer push tube 2, wherein the first screw cover 31 is screwed to the inner screw 30, and the socket part 32 is comprised of two half shells 320 and a buckle 321, and the two half shells 320 are covered onto the first screw cover 31 and extended and coupled into the outer push tube 2, and the two half shells 320 are coupled with each other by a buckle 321.

Figure 6:
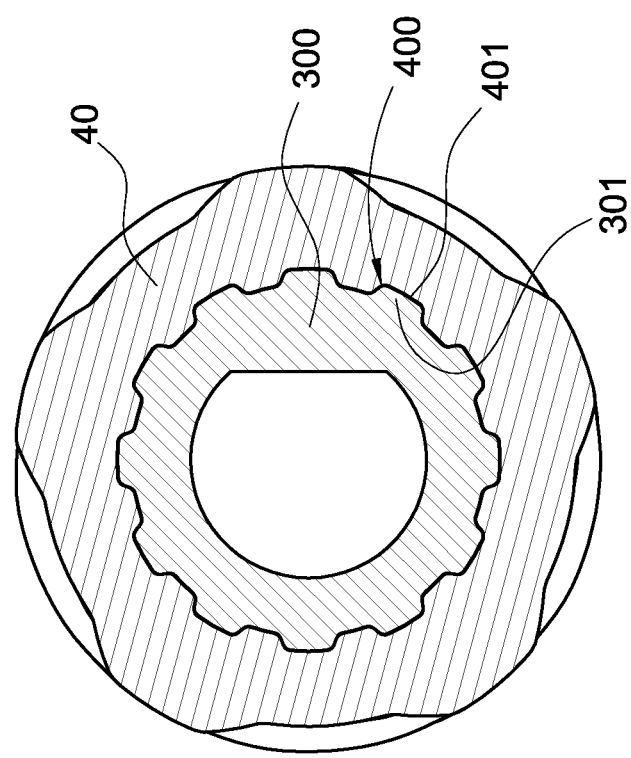
FIG. 6 is a cross-sectional view of an outer screw and a coupling of the present invention.

The second nut part 4 is coupled to the inner push tube 1, and the second nut part 4 is screwed to an outer screw 40, and the outer screw 40 is hollow for sleeving the coupling 300 into the outer screw 40 and axially movable along the outer screw 40. In a preferred embodiment of the present invention, the outer screw 40 has an inner hole 400 penetrating axially along the outer screw 40. A chute 401 is formed on an inner wall of the inner hole 400 and axially extended along the outer screw 40, and the coupling 300 has a slider 301 corresponding to the chute 401, wherein there may be a plurality of chutes 401 formed around an inner wall of the inner hole 400, and the quantity of sliders 301 corresponds to the quantity of chutes 401 (as shown in FIG. 6). In addition, the first nut part 3 further includes a bearing 33 installed between the first nut part 3 and the outer screw 40. In other words, the bearing 33 is pivotally coupled between the front end of the two half shells 320 and the outer screw 40 to increase the stability of the transmission of the outer screw 40.

With the aforementioned structure, the dual-screw linear actuator of the present invention is formed.

Figure 5:
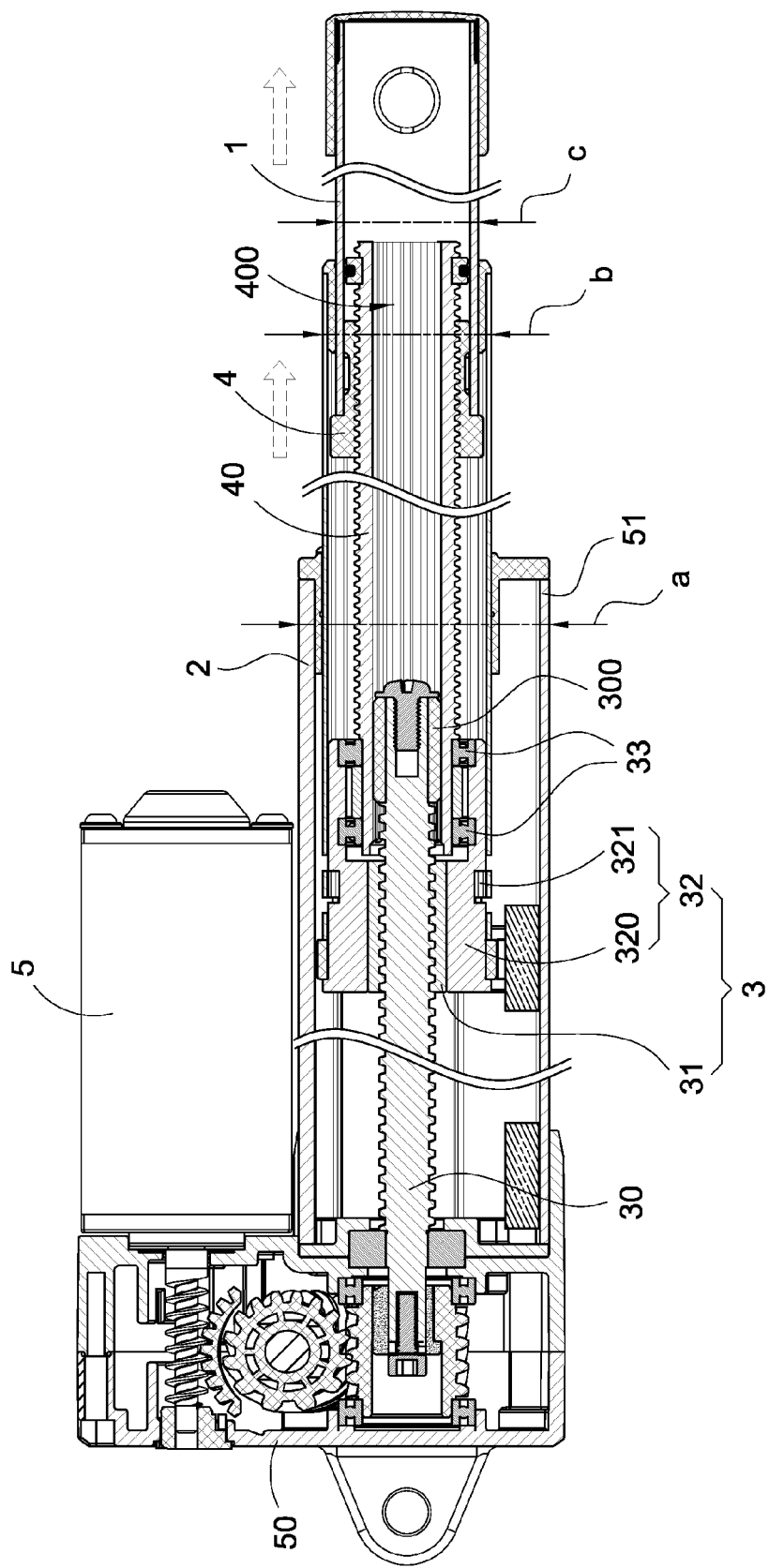
FIG. 5 is a cross-sectional view of the present invention when extended.

In FIGS. 2 and 3, the transmission of the present invention further includes a driver 5, a gearbox 50 driven by the driver 5, and a casing tube 51 coupled to the gearbox 50, wherein the gearbox 50 includes a gear transmission component such as a worm gear installed therein. The inner and outer push tubes 1, 2 are sleeved into the casing tube 51 and axially movable to define a telescopic slide, and the driver 5 drives the inner screw 30 to rotate through the gear transmission component in the gearbox 50. In FIG. 5, the casing tube 51 has an external diameter a greater than the external diameter b of the outer push tube 2, and the outer push tube 2 has an external diameter b greater than the external diameter c of the inner push tube 1, so that these tubes are sheathed with each other and arranged sequentially from the one with a greater external diameter to the one with a smaller external diameter to reduce the load when the linear actuator is extended and to improve the stability of the extension and contraction.

Figure 4:
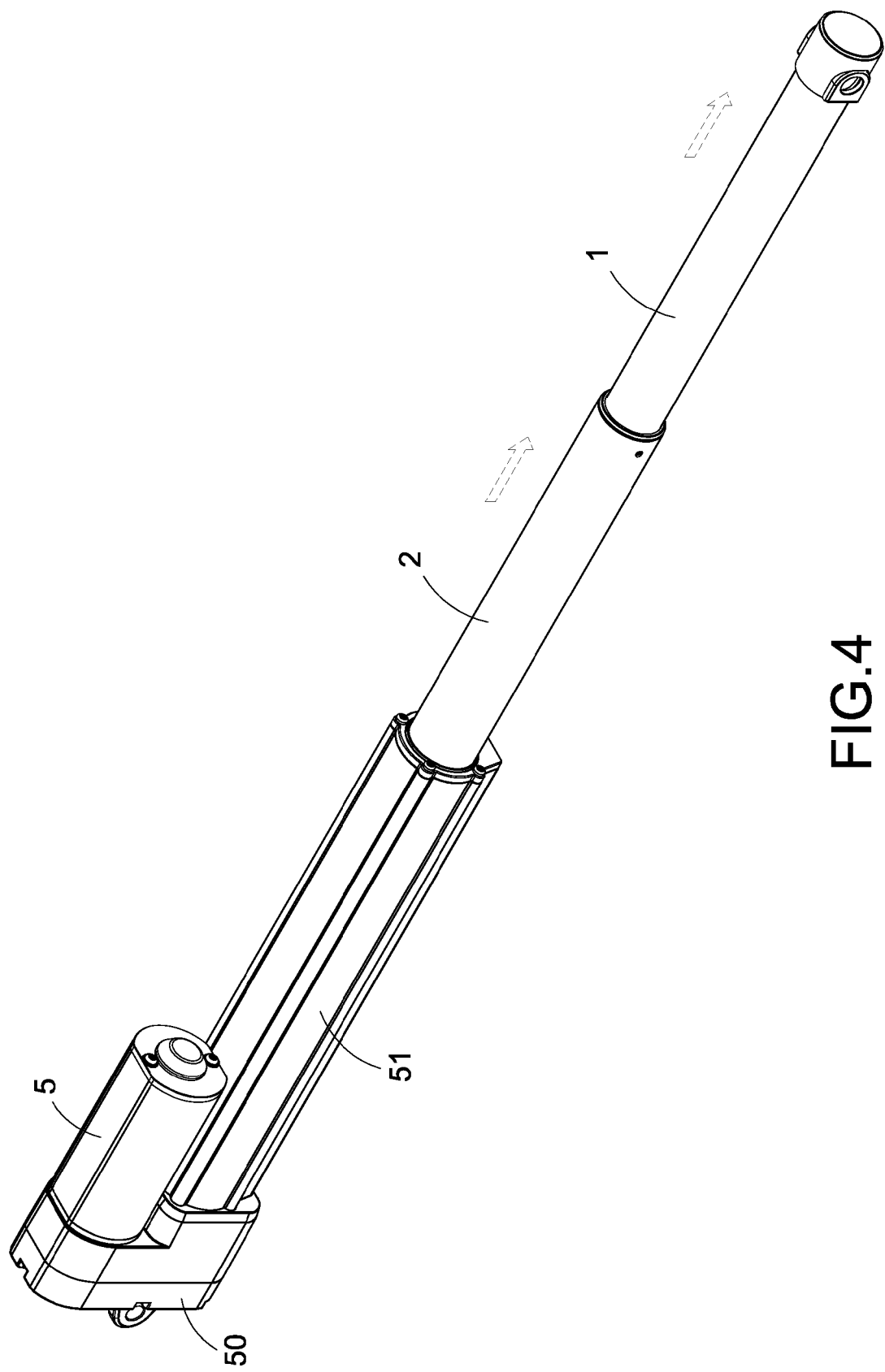
FIG. 4 is a perspective view of the present invention when extended.

In FIGS. 4 and 5, when the driver 5 drives the gear transmission component in the gearbox 50 to operate, the inner screw 30 is driven to rotate the inner screw 30 and drive the first nut part 3 to move on the inner screw 30 linearly, so as to push the outer push tube 2 towards the exterior of the casing tube 51 for an extension. In the meantime, the inner screw 30 is coupled to the outer screw 40 through the coupling 300 to drive the outer screw 40 to rotate together, so as to screw to the second nut part 4 on the outer screw 40 and move on the outer screw 40 linearly, so as to push the inner push tube 1 towards the exterior of the outer push tube 2 for an extension. On the other hand, the driver 5 rotates in an opposite direction to drive the gear transmission component in the gearbox 50 to operate, so as to contract the inner and outer push tubes 1, 2 to their original positions as shown in FIGS. 2 and 3.

In the dual-screw linear actuator of the present invention, the inner screw 30 drives the external screw rod 40 to rotate, so that the first and second nut parts 3, 4 of the inner and outer screws 30, 40 can push the inner and outer push tubes 1, 2 synchronously for an extension or a contraction to increase or even double the stroke of extension or contraction without the need of increasing the contraction dimension and meet the strict requirement for a higher or longer adjusting interval or apply the linear actuator in the aforementioned occasion.

In summation of the description above, the present invention achieves the expected objectives and overcomes the drawbacks of the prior art, and the invention complies with patent application requirements, and is thus duly filed for patent application.

While the invention has been described by means of specific embodiments, numerous modifications and variations could be made thereto by those skilled in the art without departing from the scope and spirit of the invention set forth in the claims.

What is claimed is:

1. A dual-screw linear actuator, comprising:
   an inner push tube;
   an outer push tube, sheathed on the inner push tube, and axially movable on the inner push tube;
   a first nut part assembly, directly and fixedly coupled to the outer push tube, and movably screwed to an inner screw, wherein a coupling is fixed to an end of the inner screw away from the first nut part assembly; the first nut part assembly further includes a first screw cover and a socket part covering the first screw cover, the socket part is fixedly coupled to an end of the outer push tube to move along the inner screw, and the first screw cover is screwed to the inner screw; and
   a second nut part, directly and fixedly coupled to the inner push tube, and movably screwed to an outer screw, and the outer screw being hollow, and the coupling being sleeved into the outer screw and axially movable along the outer screw;
   thereby, when the outer push tube is inserted into a casing tube and positioned by the casing tube, the outer push tube moves axially along the inner screw without rotating relative to the casing tube; when the inner screw rotates, the outer screw is driven to rotate simultaneously by the coupling fixed to the inner screw, such that the second nut part axially moves along the outer screw without rotating by being positioned by the inner push tube; thus the first nut part assembly and the second nut part on the inner and outer screws move along with the inner and outer push tubes synchronously for an extension or a contraction.

2. The dual-screw linear actuator of claim 1, wherein the inner and outer push tubes are hollow rods.

3. The dual-screw linear actuator of claim 2, wherein the outer push tube has an external diameter greater than the external diameter of the inner push tube.

4. The dual-screw linear actuator of claim 3, further comprising a driver, a gearbox driven by the driver, and the casing tube coupled to the gearbox, and the inner and outer push tubes are sleeved into the casing tube for an axial movement.

5. The dual-screw linear actuator of claim 4, wherein the casing tube has an external diameter greater than the external diameter of the inner and outer push tubes.

6. The dual-screw linear actuator of claim 1, wherein the first nut part assembly further includes a bearing installed between the first screw cover and the outer screw and pivotally coupled between a front end of the two half shells and a rear end of the outer screw.

7. The dual-screw linear actuator of claim 1, wherein the socket part is comprised of two half shells, and the two half shells are covered onto the exterior of the first screw cover and extended and coupled into the outer push tube.

8. The dual-screw linear actuator of claim 7, wherein the two half shells have a buckle for coupling the two half shells with each other.

9. The dual-screw linear actuator of claim 7, wherein the first nut part assembly further includes a bearing installed between the first screw cover and the outer screw and pivotally coupled between the front end of the two half shells and the rear end of the outer screw.

10. The dual-screw linear actuator of claim 1, wherein the outer screw includes an inner hole axially penetrating the outer screw, a chute formed on an inner wall of the inner hole and axially extended along the outer screw, and the coupling includes a slider installed thereon and corresponding to the chute.

11. The dual-screw linear actuator of claim 10, wherein the chute comes with a plural quantity and the chutes are formed around an inner wall of the inner hole.

12. The dual-screw linear actuator of claim 11, wherein the slider comes with a quantity corresponding to the quantity of the chutes.

13. The dual-screw linear actuator of claim 1, further comprising a driver, a gearbox driven by the driver, and a casing tube coupled to the gearbox, and the inner and outer push tubes are sleeved into the casing tube for an axial movement.

14. The dual-screw linear actuator of claim 13, wherein the casing tube has an external diameter greater than the external diameter of the inner and outer push tubes.

* * * * *